United States Patent
Chien et al.

(10) Patent No.: US 9,155,175 B2
(45) Date of Patent: *Oct. 6, 2015

(54) LIQUID CRYSTAL DISPLAY PANEL AND METHOD FOR MANUFACTURING THE SAME COMPRISING AT LEAST TWO CONDUCTIVE PORTIONS HAVING A RESISTIVITY EXCEEDING THAT OF AT LEAST TWO SECOND CONNECTING PORTIONS

(71) Applicant: InnoLux Corporation, Miao-Li County (TW)

(72) Inventors: Charles Chien, Miao-Li County (TW); Shang-Yu Huang, Miao-Li County (TW); Tsau-Hua Hsieh, Miao-Li County (TW); Chien-Ting Lai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,533

(22) Filed: Dec. 19, 2014

(65) Prior Publication Data

US 2015/0103301 A1 Apr. 16, 2015

Related U.S. Application Data

(63) Continuation of application No. 14/459,476, filed on Aug. 14, 2014, now Pat. No. 8,941,807, which is a continuation of application No. 12/617,878, filed on Nov. 13, 2009, now Pat. No. 8,836,904.

(30) Foreign Application Priority Data

Nov. 14, 2008 (CN) .......................... 2008 1 0217817

(51) Int. Cl.
| | | |
|---|---|---|
| G02F 1/1343 | (2006.01) | |
| C09K 19/52 | (2006.01) | |
| H05F 3/00 | (2006.01) | |
| G02F 1/13 | (2006.01) | |
| G02F 1/1345 | (2006.01) | |

(52) U.S. Cl.
CPC ................ *H05F 3/00* (2013.01); *G02F 1/1303* (2013.01); *G02F 1/1345* (2013.01); *G02F 1/13439* (2013.01); *G02F 1/13452* (2013.01); *G02F 1/134336* (2013.01); *G02F 2202/22* (2013.01)

(58) Field of Classification Search
CPC .................................. H05F 3/00; G02F 1/1303
USPC .................. 349/33, 64, 89, 90, 112, 158, 166
See application file for complete search history.

(56) References Cited

U.S. PATENT DOCUMENTS

| 8,941,807 B2 * | 1/2015 | Chien et al. .................... 349/148 |
| 2002/0044251 A1 * | 4/2002 | Togashi et al. ................. 349/149 |

* cited by examiner

*Primary Examiner* — Paul Lee
(74) *Attorney, Agent, or Firm* — Bacon & Thomas, PLLC

(57) ABSTRACT

An exemplary liquid crystal display panel includes a substrate and first conductive units. The first conductive units are arranged at a surface of the substrate. Each of the first conductive units includes a plurality of first connecting portions, a plurality of second connecting portions and a conductive portion with a plurality of conductive particles. The conductive portion is located between the first connecting portions and the second connecting portions, thus electrically connecting the first connecting portions to the second connecting portions. A method for manufacturing the liquid crystal display panel is also provided.

10 Claims, 5 Drawing Sheets

LIQUID CRYSTAL DISPLAY PANEL AND METHOD FOR MANUFACTURING THE SAME COMPRISING AT LEAST TWO CONDUCTIVE PORTIONS HAVING A RESISTIVITY EXCEEDING THAT OF AT LEAST TWO SECOND CONNECTING PORTIONS

CROSS REFERENCE TO RELATED APPLICATIONS

This application is a continuation application of U.S. patent application Ser. No. 14/459,476 filed on Aug. 14, 2014, which is a continuation application of U.S. patent application Ser. No. 12/617,878, filed Nov. 13, 2009, which claims priority of CN 200810217817.9, filed Nov. 14, 2008 (of which the entire disclosure of the pending, prior applications is hereby incorporated by reference).

BACKGROUND OF THE INVENTION

1. Field of the Invention

The present disclosure relates generally to liquid crystal display (LCD) panels and, more particularly, to an LCD panel with reduced static electricity discharge and a method for manufacturing the same.

2. Description of Related Art

The thin and lightweight characteristics of LCD displays make them suitable for use in a wide variety of electronic devices such as personal digital assistants (PDAs), mobile phones, portable personal computers, and so on. An LCD device generally includes an LCD panel for displaying data, and a backlight module to provide light for the LCD panel.

During manufacture of the LCD panel, electrostatic charge tends to accumulate on the LCD panel. If enough electrostatic charge builds up to cause a discharge, damage to the LCD panel can occur. The static electricity generally accumulates at connections between conductive units.

In order to solve the described problem, electrostatic protection is provided in the LCD panel. For example, a system installed in the LCD panel includes a dummy line and an insulating layer. The dummy line is adjacent to the connecting portion of the conductive units, and is connected to a ground terminal. The insulating layer is positioned between the conductive units and the dummy line. When static electricity accumulates on the connecting portion of the conductive units, the static electricity is transferred to the dummy line via a breakdown discharge of the insulating layer, and is led to the ground terminal. Thus, accumulation of static electricity is avoided.

However, the LCD panel often has a multiplicity of conductive units inside, with a corresponding multiplicity of connecting portions. The requirement for electrostatic protection is correspondingly high. Manufacturing of the LCD panel is complex, and the LCD panel is costly.

Therefore, an LCD panel and a method for manufacturing the LCD panel which can overcome the described limitations are desired.

SUMMARY OF THE INVENTION

An object of the present invention is to provide a liquid crystal display (LCD) panel, comprising: a substrate; and at least one first conductive unit arranged on the substrate, each of the at least one first conductive unit comprising at least one first connecting portion, at least two second connecting portions, and at least two conductive portions, the at least two conductive portions being located between two parts of the at least one first connecting portion and the at least two second connecting portions respectively thus electrically connecting the at least two second connecting portions through the at least one first connecting portion; and at least one second conductive unit arranged on the substrate, and insulated from the at least one first conductive unit, wherein the at least one first connecting portion is above the at least one second conductive unit with respect to a main surface of the substrate and crosses the at least one second conductive unit, and wherein at least a part of the at least one second conductive unit is located between the at least two second connecting portions, wherein a resistivity of each of the at least two conductive portions exceeds that of each of the at least two second connecting portions.

Another object of the present invention is to provide a method for manufacturing a liquid crystal display (LCD) panel, the method comprising: providing a substrate, and forming at least one first conductive unit arranged on the substrate, each of the at least one first conductive unit comprising at least one first connecting portion, at least two second connecting portions, and at least two conductive portions, the at least two conductive portions being located between two parts of the at least one first connecting portion and the at least two second connecting portions respectively thus electrically connecting the at least two second connecting portions through the at least one first connecting portion; and forming at least one second conductive unit arranged on the substrate, and insulated from the at least one first conductive unit, wherein the at least one first connecting portion is above the at least one second conductive unit with respect to a main surface of the substrate and crosses the at least one second conductive unit, and wherein at least a part of the at least one second conductive unit is located between the at least two second connecting portions, wherein a resistivity of each of the at least two conductive portions exceeds that of each of the at least two second connecting portions.

Other objects, advantages, and novel features of the invention will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENT

Figure 1:
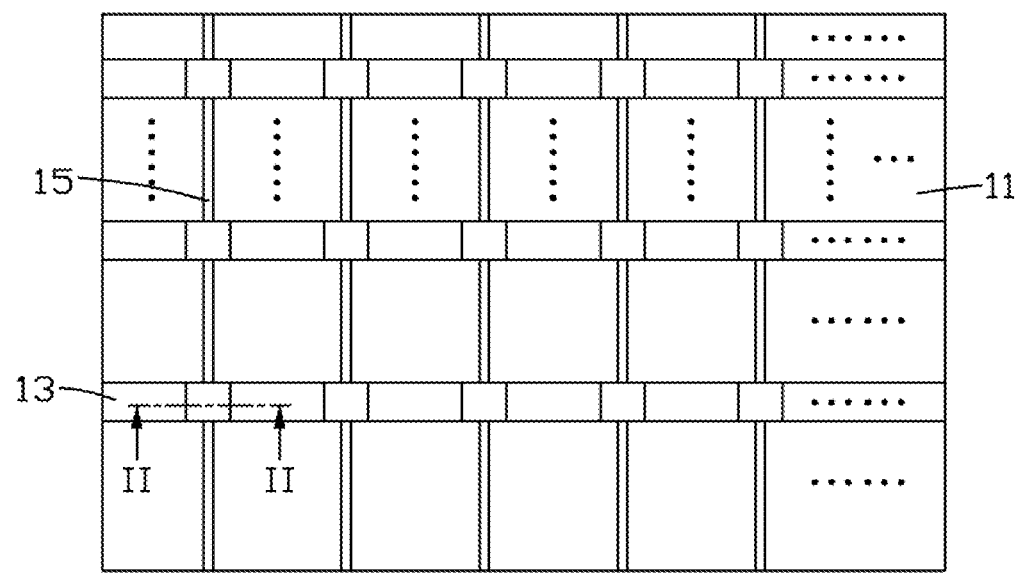
FIG. 1 is a schematic, abbreviated plan view of an embodiment of an LCD panel.
Figure 2:
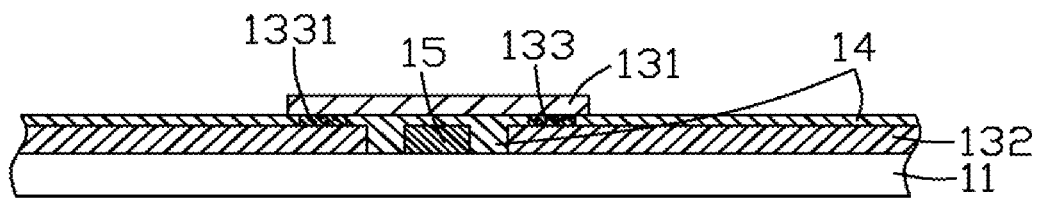
FIG. 2 is a cross-section of the LCD panel of FIG. 1 taken along line II-II thereof.

Referring to FIGS. 1 and 2, an embodiment of an LCD panel 10 includes a substrate 11, one or more first conductive units 13, an insulating layer 14, and one or more second conductive units 15. In the illustrated embodiment, the LCD panel 10 includes a plurality of first conductive units 13 and a plurality of second conductive units 15. The first conductive units 13 are disposed on the substrate 11 substantially parallel to each other. The second conductive units 15 are disposed on the substrate 11 substantially parallel to each other, and substantially perpendicular to each of the first conductive units 13. The insulating layer 14 is positioned between the first conductive units 13 and the second conductive units 15.

Each first conductive unit 13 includes one or more first connecting portions 131, one or more second connecting portions 132, and one or more conductive portions 133 therebetween. In the illustrated embodiment, each first conductive unit 13 includes a plurality of first connecting portions 131, a plurality of second connecting portions 132, and a plurality of conductive portions 133. The conductive portions 133 have a plurality of conductive particles 1331 therein. The conductive particles 1331 are randomly, but substantially uniformly, distributed throughout each conductive portion 133. The second connecting portions 132 are attached to the substrate 11. Each second connecting portion 132 is substantially perpendicular to each second conductive unit 15. Each two second connecting portions 132 at opposite sides of one second conductive unit 15 are symmetric relative to each other. The first connecting portions 131 are above the second conductive units 15. The conductive portions 133 are positioned at two ends of each first connecting portion 131, between the first connecting portion 131 and the two adjacent second connecting portions 132, thus electrically connecting the first connecting portion 131 to the adjacent second connecting portions 132. The conductive particles 1331 are electrically conductive, and the base material of the conductive portions 133 is relatively highly resistive. Thus the resistivity of each conductive portion 133 exceeds that of each second connecting portions 132. In the illustrated embodiment, the first connecting portions 131 and the second connecting portions 132 are made of metal, such as copper (Cu). The base material of the conductive portions 133 is made of or comprises resin, such as polyphenyl butyl-butylamine resin. The conductive particles 1331 are made of ITO (Indium Tin Oxide).

Electrostatic charge accumulating on the second connecting portions 132 is conducted to the conductive portions 133. The conductive particles 1331 of each conductive portion 133 are heated by a transient high-voltage generated by the electrostatic charge due to the high resistivity of the conductive portions 133. That is, energy of the electrostatic charge is transformed to heat the conductive particles 1331. When the energy of the electrostatic charge is fully transformed to heat the conductive particles 1331, the electrostatic charge is dissipated, with no electrostatic charge passing through the conductive portion 133 and entering the corresponding first connecting portion 131. During the process of heating the conductive particles 1331, some of the conductive particles 1331 are burned by the transient high-voltage, with other conductive particles 1331 are not burned by the transient high-voltage and thereby helping maintain electrical connection between the corresponding second connecting portion 132 and the corresponding first connecting portion 131. Since no electrostatic charge enters the first connecting portion 131, a voltage difference between the first conductive unit 13 and the corresponding second conductive unit 15 is low, and static electricity discharge therebetween is avoided.

Since the LCD panel 10 has the conductive portions 133 with the conductive particles 1331, electrostatic charge is eliminated by burning of some of the conductive particles 1331. Thus, static electricity buildup in the first conductive units 13 is avoided, and electrostatic discharge to the second conductive units 15 is prevented. In addition, the LCD panel 10 requires no additional electrostatic protection.

Figure 3:
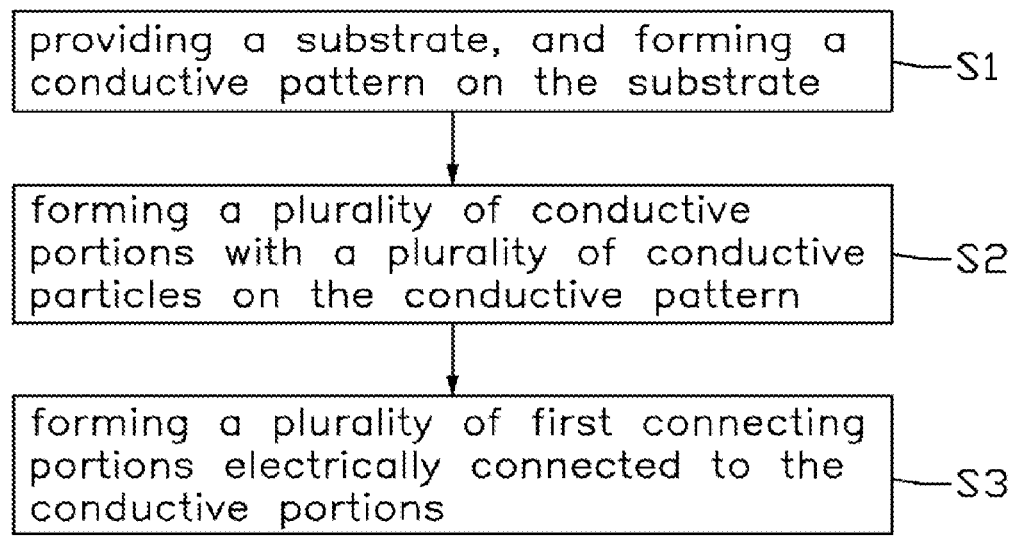
FIG. 3 is a flowchart of an exemplary method for manufacturing an LCD panel.
Figure 4:
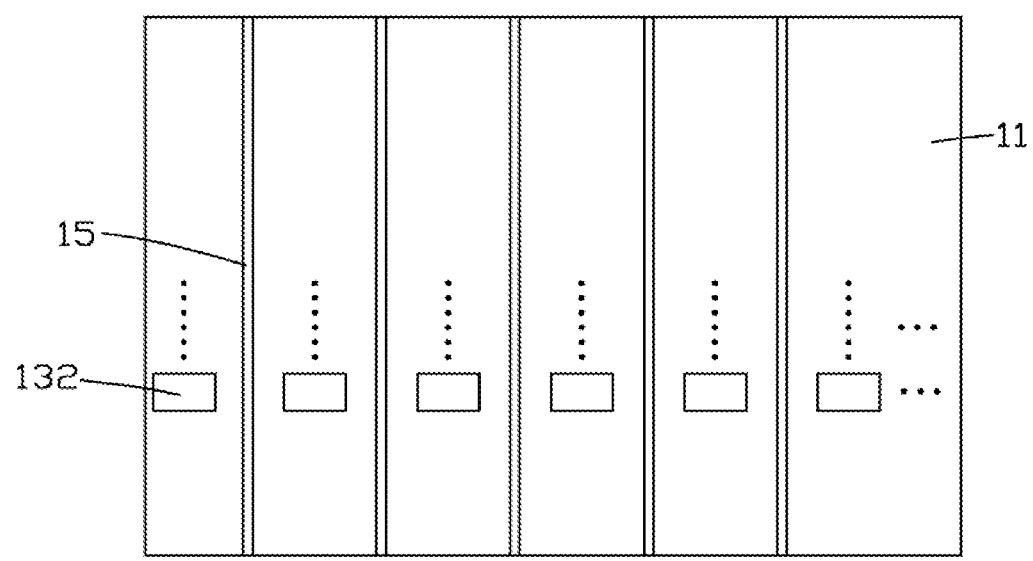
FIGS. 4 and 5 are abbreviated plan views showing an LCD panel at two different stages in the method of FIG. 3.

Referring to FIG. 3, an exemplary method for manufacturing an LCD panel, such as, for example, the LCD panel 10, is described as follows:

In step S1, a substrate 11 is provided, and a conductive pattern is formed on the substrate 11. Referring to FIG. 4, in the illustrated embodiment, the substrate 11 is made of silicon or silicon dioxide. The conductive pattern is comprised of a plurality of second connecting portions 132 of the first conductive units 13, and a plurality of second conductive units 15. Columns of the second connecting portions 132, and the second conductive units 15, are alternately arranged on the substrate 11.

Figure 5:
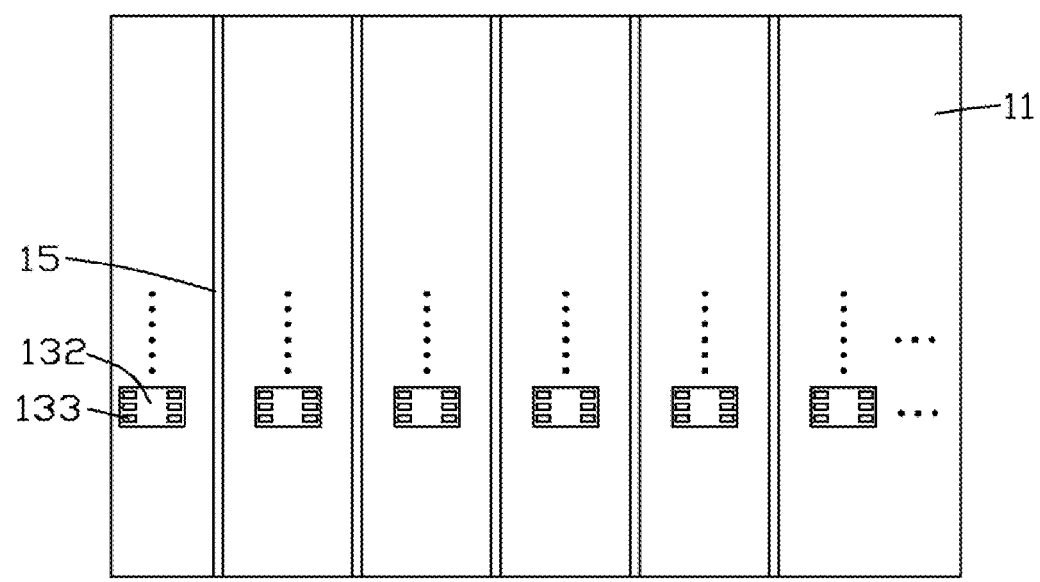

In step S2, the conductive portions 133 with a plurality of conductive particles 1331 are formed on the conductive pattern. Referring to FIG. 5, in the illustrated embodiment, a first photoresist layer is deposited on the substrate 11, the second connecting portions 132, and the second conductive units 15. The first photoresist layer is patterned, such that certain areas of the first photoresist layer contain ITO (Indium Tin Oxide), and other areas of the first photoresist layer do not contain ITO. In particular, the first photoresist layer is formed by printing ITO on predetermined portions of a base material made of polyphenyl butyl-butylamine resin. The conductive portions 133 are formed in the first photoresist layer in a predetermined pattern by exposing the areas of the first photoresist layer containing ITO to UV (ultraviolet) irradiation and masking the other areas of the first photoresist layer not containing ITO. Thus the conductive particles 1331 made of ITO are formed in the exposed areas of the first photoresist layer. After that, the other areas of the first photoresist layer are exposed to UV irradiation to form the insulating layer 14 on the substrate 11, the second conductive units 15, and the second connecting portions 132. Thus, the formed insulating layer 14 is made of resin.

In step S3, the first connecting portions 131 of the first conductive units 13 are formed such that they electrically connect to the corresponding conductive portions 133. In the illustrated embodiment, a second photoresist layer is deposited on the insulating layer 14 and the conductive portions 133. The second photoresist layer is exposed to UV irradiation to form the first connecting portions 131. Each first connecting portion 131 electrically connects two adjacent second connecting portions 132 via the conductive portions 133.

During manufacture of the LCD panel 10, the second connecting portions 132 of the first conductive units 13, and the second conductive units 15, are formed simultaneously. The conductive portions 133 of the first conductive units 13 are formed on the second connecting portions 132, and the first connecting portions 131 of the first conductive units 13 are formed on the conductive portions 133. Therefore, the second connecting portions 132 are electrically connected to the first connecting portions 131 via the conductive portions 133. With this configuration, electrostatic charge can be eliminated by burning of some conductive particles 1331 of the conductive portions 133. Accordingly, static electricity buildup in the first conductive units 13 is avoided, and electrostatic discharge to the second conductive units 15 is prevented.

It should be pointed out that in alternative embodiments, the second conductive units 15 may have a structure similar to that of the first conductive units 13 of the above-described embodiment. That is, each second conductive unit 15 may have a plurality of first connecting portions, a plurality of second connecting portions, and a plurality of conductive portions located between the first connecting portions and the second connecting portions.

It is believed that the present embodiments and their advantages will be understood from the foregoing description, and it will be apparent that various changes may be made thereto without departing from the spirit and scope of the disclosure or sacrificing all of its material advantages.

Although the present invention has been explained in relation to its preferred embodiment, it is to be understood that many other possible modifications and variations can be made without departing from the spirit and scope of the invention as hereinafter claimed.

What is claimed is:

1. A liquid crystal display (LCD) panel, comprising:
    a substrate; and
    at least one first conductive unit arranged on the substrate, each of the at least one first conductive unit comprising at least one first connecting portion, at least two second connecting portions, and at least two conductive portions, the at least two conductive portions being located between two parts of the at least one first connecting portion and the at least two second connecting portions respectively thus electrically connecting the at least two second connecting portions through the at least one first connecting portion; and
    at least one second conductive unit arranged on the substrate, and insulated from the at least one first conductive unit, wherein the at least one first connecting portion is above the at least one second conductive unit with respect to a main surface of the substrate and crosses the at least one second conductive unit, and
    wherein at least a part of the at least one second conductive unit is located between the at least two second connecting portions,
    wherein a resistivity of each of the at least two conductive portions exceeds that of each of the at least two second connecting portions.

2. The LCD panel of claim 1, wherein the at least one first conductive unit comprises a plurality of first conductive units disposed substantially parallel to each other on the substrate.

3. The LCD panel of claim 1, wherein the at least one second conductive unit comprises a plurality of second conductive units disposed substantially parallel to each other on the substrate.

4. The LCD panel of claim 1, wherein the at least two second connecting portions are provided on the substrate under the at least one first connecting portion.

5. The LCD panel of claim 1, wherein the substrate is made of one of silicon and silicon dioxide.

6. The LCD panel of claim 1, wherein the at least two conductive portions comprises a plurality of conductive particles made of indium tin oxide (ITO).

7. A method for manufacturing a liquid crystal display (LCD) panel, the method comprising:
    providing a substrate, and
    forming at least one first conductive unit arranged on the substrate, each of the at least one first conductive unit comprising at least one first connecting portion, at least two second connecting portions, and at least two conductive portions, the at least two conductive portions being located between two parts of the at least one first connecting portion and the at least two second connecting portions respectively thus electrically connecting the at least two second connecting portions through the at least one first connecting portion; and
    forming at least one second conductive unit arranged on the substrate, and insulated from the at least one first conductive unit, wherein the at least one first connecting portion is above the at least one second conductive unit with respect to a main surface of the substrate and crosses the at least one second conductive unit, and
    wherein at least a part of the at least one second conductive unit is located between the at least two second connecting portions,
    wherein a resistivity of each of the at least two conductive portions exceeds that of each of the at least two second connecting portions.

8. The method for manufacturing an LCD panel of claim 7, wherein the at least one first conductive unit is substantially perpendicular to the at least one second conductive unit.

9. The method for manufacturing an LCD panel of claim 7, wherein the at least two conductive portions comprises a plurality of conductive particles made of indium tin oxide (ITO).

10. The method for manufacturing an LCD panel of claim 7, wherein the substrate is made of one of silicon and silicon dioxide.

* * * * *